United States Patent
Horiuchi et al.

(10) Patent No.: US 6,663,303 B2
(45) Date of Patent: Dec. 16, 2003

(54) PRINTER DRIVER, PRINTING CONTROL METHOD, AND DATA STORAGE MEDIUM

(75) Inventors: Yukiharu Horiuchi, Chinō (JP); Katsuhito Kitahara, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/089,871

(22) PCT Filed: Apr. 19, 2001

(86) PCT No.: PCT/JP01/03361
§ 371 (c)(1),
(2), (4) Date: Jun. 4, 2002

(87) PCT Pub. No.: WO02/11991
PCT Pub. Date: Feb. 14, 2002

(65) Prior Publication Data
US 2002/0164185 A1 Nov. 7, 2002

(30) Foreign Application Priority Data
Aug. 4, 2000 (JP) ........................................ 2000-237084

(51) Int. Cl.$^7$ ................................................ B41J 11/44
(52) U.S. Cl. .............................. 400/61; 400/70; 400/76
(58) Field of Search ............................ 400/61, 76, 70, 400/582

(56) References Cited

FOREIGN PATENT DOCUMENTS

| JP | 62-173943 | | 11/1987 | | |
|---|---|---|---|---|---|
| JP | 1-234277 | | 9/1989 | | |
| JP | 4-105968 | | 4/1992 | | |
| JP | 11254772 A | * | 9/1999 | ............ | B41J/11/70 |
| JP | 2000117689 A | * | 4/2000 | ............ | B26D/5/20 |

* cited by examiner

Primary Examiner—Charles H. Nolan, Jr.
(74) Attorney, Agent, or Firm—Rosalio Haro

(57) ABSTRACT

When printing a print document for which there is a print request from an application program, printing the one or plural print documents printed by page unit where a specific paper size is one page is controlled based on plural combinations of print paper feeding and cutting.

24 Claims, 10 Drawing Sheets

(a)

(b)

(a)

(b)

(a)

(b)

PRINTER DRIVER, PRINTING CONTROL METHOD, AND DATA STORAGE MEDIUM

FIELD OF TECHNOLOGY

The present invention relates to a printer driver, a printing control method, and a data storage medium. More particularly, the invention relates to a data storage medium, printing control method, and printer driver having means for controlling printing one or multiple print documents printed in page units based on plural combinations of printing paper feeding and paper cutting operations.

RELATED ART

The hardware resources (referred to below as simply "resources") shared by various application programs in data processing devices such as computers are conventionally centrally controlled and managed by the operating system. A driver written in software corresponds to each resource and can operate as a device (driver) for managing the resource by running the driver program on the data processing device.

For example, a printer is one such resource and an application program running on the data processing device uses the printer to print by means of a procedure such as follows.

(1) The application program sends a print request containing information about the print document to be printed to the operating system. More specifically, it specifies parameters such as the address in memory where the print document data is stored and the amount of data stored, and invokes a system call to the operating system.

(2) The operating system invokes a service routine provided by the printer driver, passing the print document data parameters to the service routine.

(3) The printer driver service routine presents the current printer settings on a display connected to the data processing device, for example, for confirmation by the user. The printer settings typically enable specifying the paper size and orientation, for example.

(4) Once the settings are confirmed, the service routine generates a print command for the printer from the print document data and printer settings, and sends the print command to the printer.

The printer driver thus functions to relay print settings for the printer and commands from the application program for printing to the printer. The printer driver therefore functions as a control part performing said function as a result of the program requesting said function.

By incorporating the printer driver program into the computer or other data processing device, the data processing device functions as a printer driver device.

Printers built into or used in conjunction with POS terminals, ATM terminals, and kiosk terminals include printers that use rolls of paper. A transport mechanism (transport unit) for advancing the paper to create blank space on the paper, and a cutter mechanism (paper cutting unit) for cutting the roll of paper to a desired length, are built in to this type of printer using roll paper.

However, printer setting requests for paper feeding and paper cutting, to a printer that uses a roll of paper, are handled separately by the application program selecting the printer driver performing a desired function from among multiple printer drivers having different functions for paper feeding and paper cutting. For example, if the paper orientation is set to "portrait," there are two types of printer drivers, a printer driver written to advance the paper to create blank space after the printed part of the page on which the print document is printed and then cut the paper after advancing it, and a printer driver written to advance the paper to create blank space after the printed part of the page on which the print document is printed without then cutting the paper.

If two types of printer drivers such as described above are built into the POS terminal, ATM terminal, or kiosk terminal, one of the printer drivers must be selected when creating the application program and the application program then written to match the selected printer driver; when one type of printer driver is selected and only the selected printer driver is built into the data processing device, the application program must be written to match the included printer driver. The problem, therefore, is that the application program must be separately developed for each printer driver.

A further problem is that when print documents are printed in page units of a specified paper size, paper feeding and paper cutting are always performed to create blank space after the printed part of the page, and it is therefore not possible to print report style print documents, such as a daily sales report, having an indefinite page length.

The present invention is therefore directed to a solution for the above problems and an object of the invention is to provide a printer driver, printing control method, and data storage medium having means for controlling printing one or multiple print documents printed in page units where a particular paper size is one page based on plural combinations of print paper feeding and paper cutting operations when printing a print document for which there is a print request from an application program.

SUMMARY OF THE INVENTION

The inventors have extensively researched solutions for the above described problems. As a result we found that an application program can be written without considering the printer driver by controlling paper advancement for each page of the print document and controlling paper advancement for the print document, controlling whether or not to cut the print paper after advancing the page, and controlling printing in page units of the one or plural print documents based on plural combinations of paper feeding and paper cutting operations when printing one or plural print documents for which a print request is received from an application program. In other words, we proved that regardless of the application program used, printer settings can be made by means of the common interface printer driver.

Furthermore, we also proved that print documents in a report format for which the paper length is indefinite, such as daily sales reports, can also be printed.

The present invention based on these research results is described below.

A printer driver according to the present invention is characterized by comprising a page interval control means for controlling printing one or multiple print documents printed by page unit where a specific paper size is one page based on plural combinations of print paper feeding and cutting.

The page interval control means is further characterized by comprising a paper feed control means for controlling paper feeding by each page of the printed one or plural print documents and controlling paper feeding by each document of the print documents; and a paper cutting control means for controlling cutting the print paper.

The paper feed control means in this case is characterized by advancing the paper at each page of the one or plural print documents, or by advancing the paper at each document of the one or plural print documents.

Further preferably in this case the paper cutting control means controls whether or not to cut the print paper after a paper feed.

A printer driver according to the present invention is further characterized by further comprising: (a) a print request receiving means for receiving a print request containing print document data from an application program; (b) a settings data display control means for selecting and displaying printer settings data according to a print request received by the print request receiving means; (c) an input control means for controlling inputting specific information for printing the print document; (d) a print data generating means for generating print data based on the printer settings and said specific information for printing the print document; and (e) a transmission means for sending the print data and print output command to a printer.

In this case the settings data display control means is characterized by displaying the plural combinations of print paper feeding and cutting controlled by the page interval control means.

Yet further preferably in this case the input control means is characterized by selecting a paper orientation specifying whether an indefinite length direction of the paper is printed as the document length or printed as the document width. In addition, the input control means is characterized by selecting a desired combination from the plural combinations of print paper feeding and cutting controlled by the page interval control means.

A printing control method according to the present invention is characterized by comprising a page interval control step for controlling printing one or multiple print documents printed by page unit where a specific paper size is one page based on plural combinations of print paper feeding and cutting.

The page interval control step is further characterized by comprising a paper feed control step for controlling paper feeding by each page of the printed one or plural print documents and controlling paper feeding by each document of the print documents; and a paper cutting control step for controlling cutting the print paper.

In this case the paper feed control step is characterized by advancing the paper at each page of the one or plural print documents, or by advancing the paper at each document of the one or plural print documents.

Yet further preferably in this case the paper cutting control step controls whether or not to cut the print paper after a paper feed.

The printing control method is further characterized by further comprising: (a) a print request receiving step for receiving a print request containing print document data from an application program; (b) a settings data display control step for selecting and displaying printer settings data according to a print request received by the print request receiving step; (c) an input control step for controlling inputting specific information for printing the print document; (d) a print data generating step for generating print data based on the printer settings and said specific information for printing the print document; and (e) a transmission step for sending the print data and print output command to a printer.

In this case the settings data display control step is characterized by displaying the plural combinations of print paper feeding and cutting controlled by the page interval control step.

Yet further preferably, the input control step is characterized by selecting a paper orientation specifying whether an indefinite length direction of the paper is printed as the document length or printed as the document width. In addition, the input control step is characterized by selecting a desired combination from the plural combinations of print paper feeding and cutting controlled by the page interval control step.

A data storage medium according to the present invention is a data storage medium recording a program of the above printing control method. The data storage medium can be a Compact Disc, floppy disk, hard disk, magneto-optical disc, Digital Video Disc, semiconductor memory, or magnetic tape.

BEST MODE FOR ACHIEVING THE INVENTION

A preferred embodiment of the present invention is described below with reference to the accompanying figures. It is to be noted that the following embodiments are shown by way of description only and shall not limit the scope of the invention. It will be obvious to one with ordinary skill in the related art that various alternative embodiments can be achieved by replacing some or all of the elements described below with equivalent elements, and all such variations are included in the scope of this invention.

Figure 1:
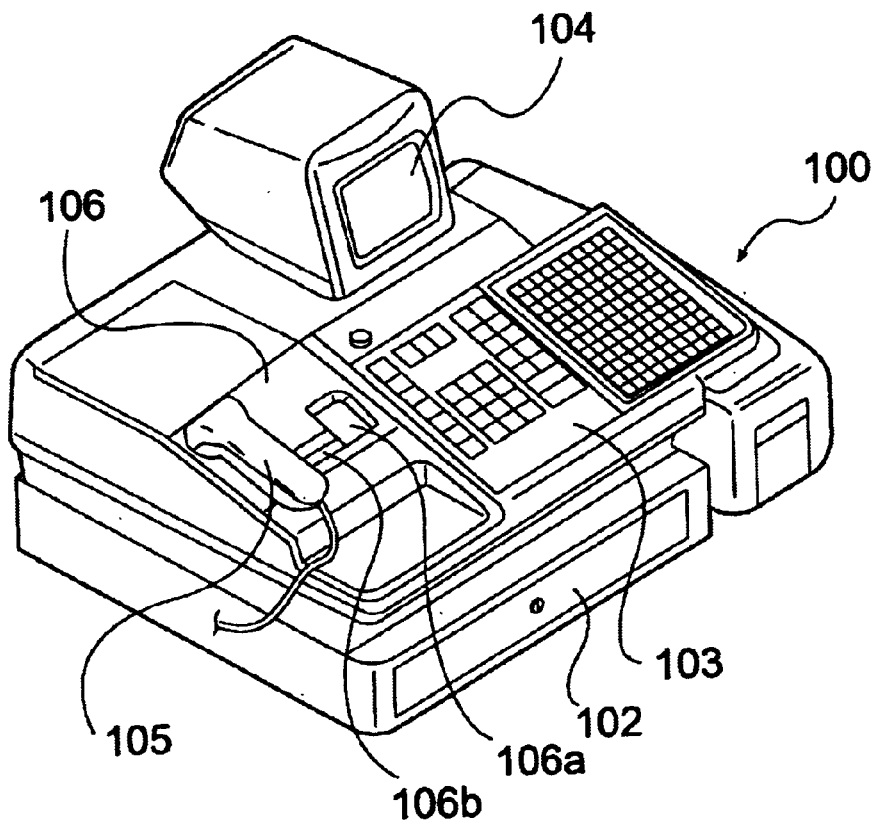
FIG. 1 is a perspective view showing the appearance of a POS terminal.

FIG. 1 is an perspective view showing the appearance of a POS terminal. POS terminal 100 has a cash drawer 102 at the bottom of the unit and a keyboard 103, display 104, hand scanner 105, and printer 106 on top. A card reader can also be disposed to the POS terminal 100.

The printer 106 in this case is built into the top of the unit with receipt exit 106a and journal confirmation window 106b formed in the top surface of the terminal. The POS terminal 100 may also have a receipt issuing function. In other words, the printer 106 is also used as a printer for issuing sales receipts and the receipt exit 106a is also used as a sales receipt exit. A printer for issuing sales receipts could, of course, also be disposed to the POS terminal 100.

In addition to number keys, a department key, subtotal key, total key, and other keys needed for product registration, the keyboard 103 also has a receipt key for issuing sales receipts.

Figure 2:
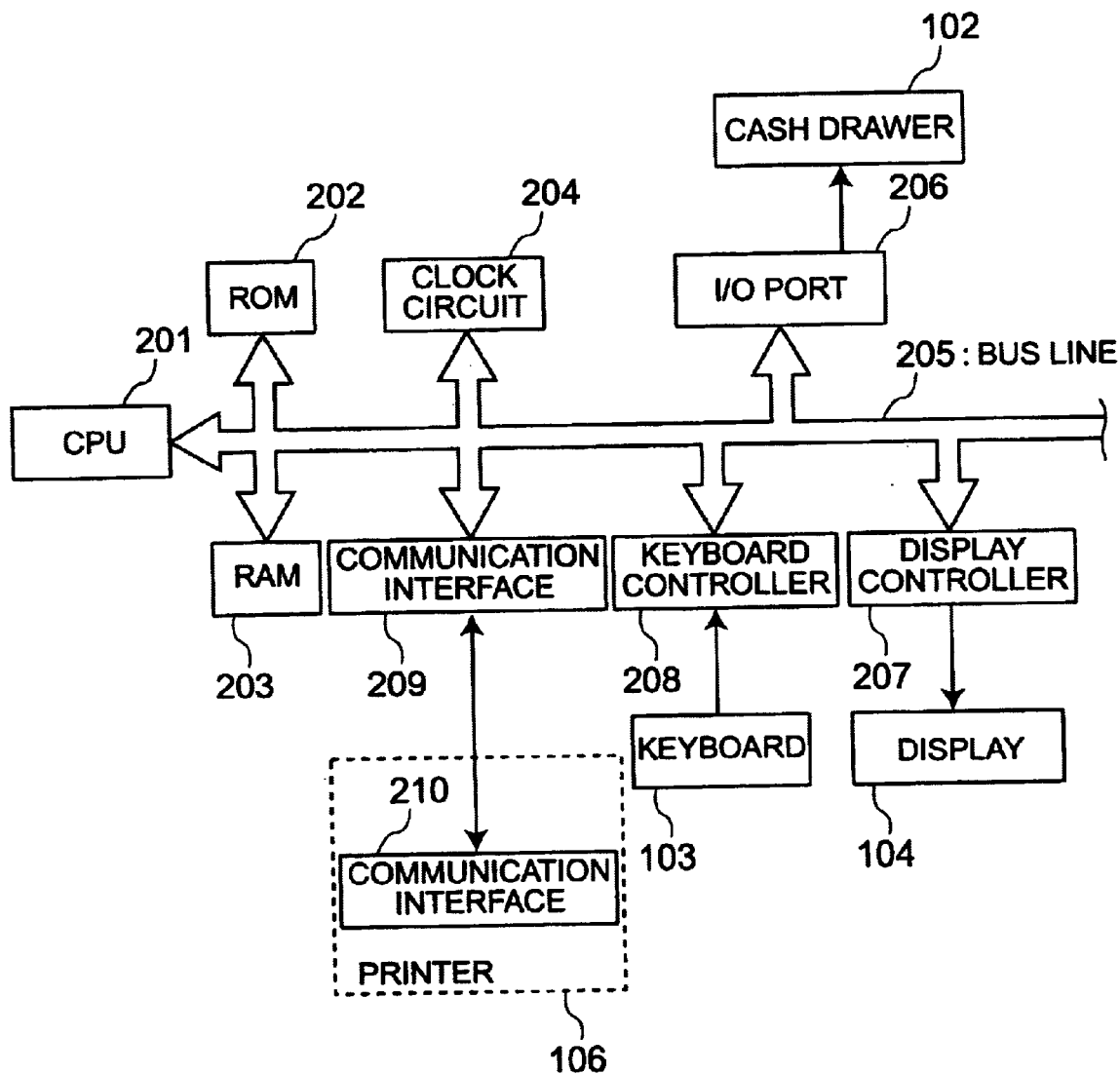
FIG. 2 is a block diagram showing the control circuit of the POS terminal.

FIG. 2 is a block diagram showing the control circuit of the POS terminal. As shown in FIG. 2 ROM 202 storing program data, RAM 203 in which various memory units (storage areas) are formed for data processing, clock circuit 204 for tracking the current date and time, I/O port 206 for outputting a drive signal to open the cash drawer 102, display controller 207 for driving and controlling the display 104 to display text data corresponding to the display data, keyboard controller 208 for capturing key signals corresponding to key input from the keyboard 103, and communication interface 209 for sending data such as control commands and data for printing to the printer 106, are connected via bus line 205 to the CPU (central processing unit) 201. A communication interface 210 for receiving data from the communication interface 209 is connected to the printer 106. A program stored on a hard disk not shown in the figure is run in RAM 203. It should be noted that the data stored or to be stored in ROM 202 and RAM 203 may be data stored or to be stored in a database on a hard disk not shown in the figure.

Figure 3:
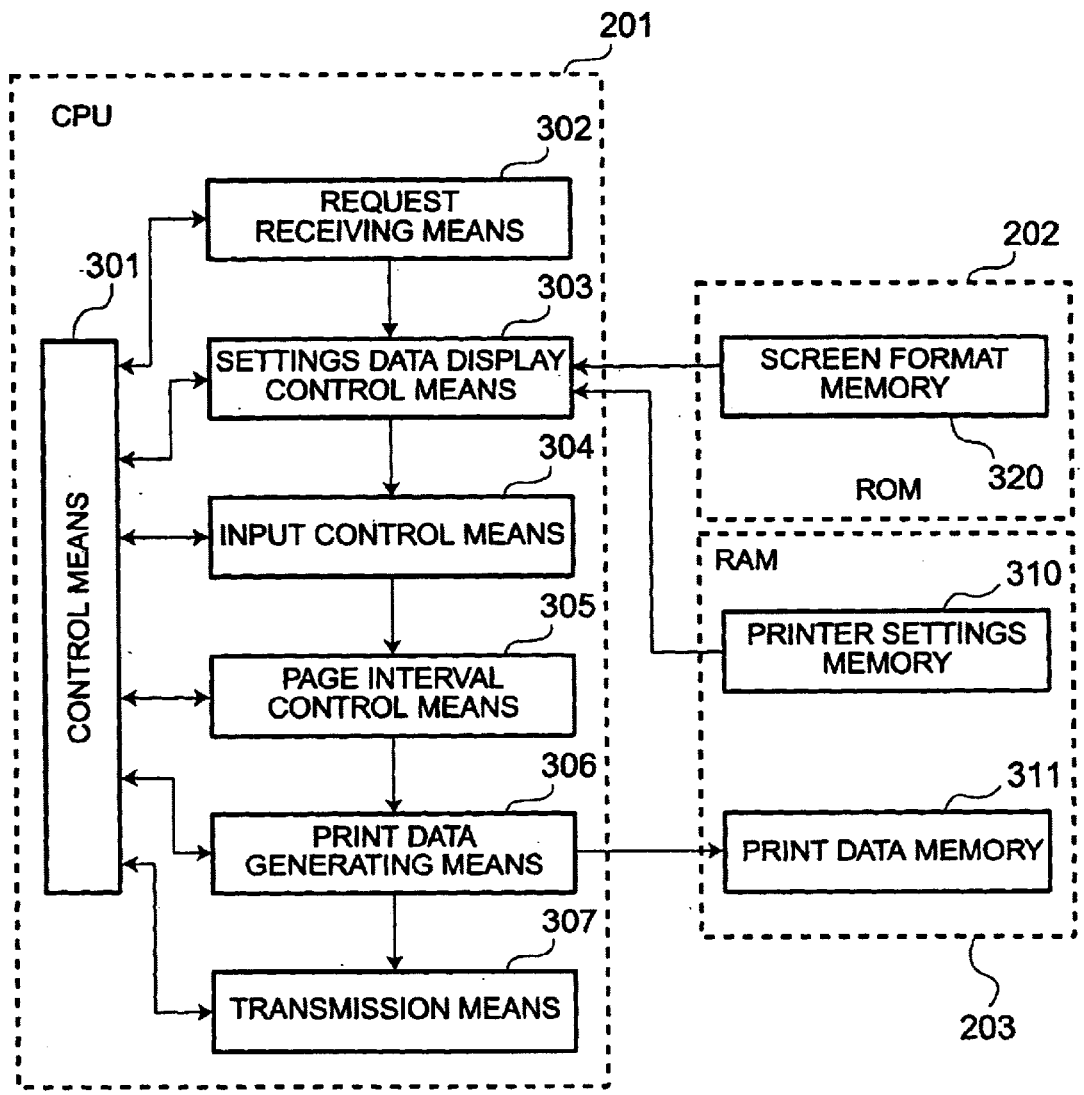
FIG. 3 is a function block diagram of the printer driver.

FIG. 3 is a function block diagram of a printer driver. Each of the functions is described below. As shown in FIG. 3, the CPU 201 has a control means 301, request receiving means 302, settings data display control means 303, input control means 304, page interval control means 305, print data generating means 306, and transmission means 307.

The request receiving means 302 of CPU 201 receives print requests for the printer from an application program together with the print document.

The settings data display control means 303 of CPU 201 presents the printer settings for the print document received by the request receiving means 302 on the display based on the printer settings stored in printer settings memory 310 of RAM 203 and the screen format stored in the screen format memory 320 of ROM 202.

The input control means 304 of CPU 201 selects or inputs data according to the printer settings displayed by the settings data display control means 303. Note that there are two printer settings here: page mode and paper orientation. The page mode is a printer setting for specifying plural combinations of paper feeding and cutting operations for the print paper used to print the print document, and paper orientation is a printer setting for specifying whether the indefinite length direction of the roll of paper is to be printed as the paper length or width.

The page interval control means 305 of CPU 201 determines whether to advance the paper to create blank space after the printed part of the page, and whether to cut the paper after advancing the paper, based on the page mode printer setting input with the input control means 304.

The print data generating means 306 of CPU 201 generates print data for sending a print image of the print document to the printer by generating print data that is an image of the print document and then adding thereto information on the presence or absence of blank space after the printed part of the page and the presence or absence of paper cutting as determined by the page interval control means 305.

The transmission means 307 of CPU 201 sends the print data generated by the print data generating means 306 together with a print request to the printer. It will be obvious that the print data could also contain the print request.

The control means 301 of CPU 201 controls and correlates operation of the request receiving means 302, settings data display control means 303, input control means 304, page interval control means 305, print data generating means 306, and transmission means 307.

Figure 4:
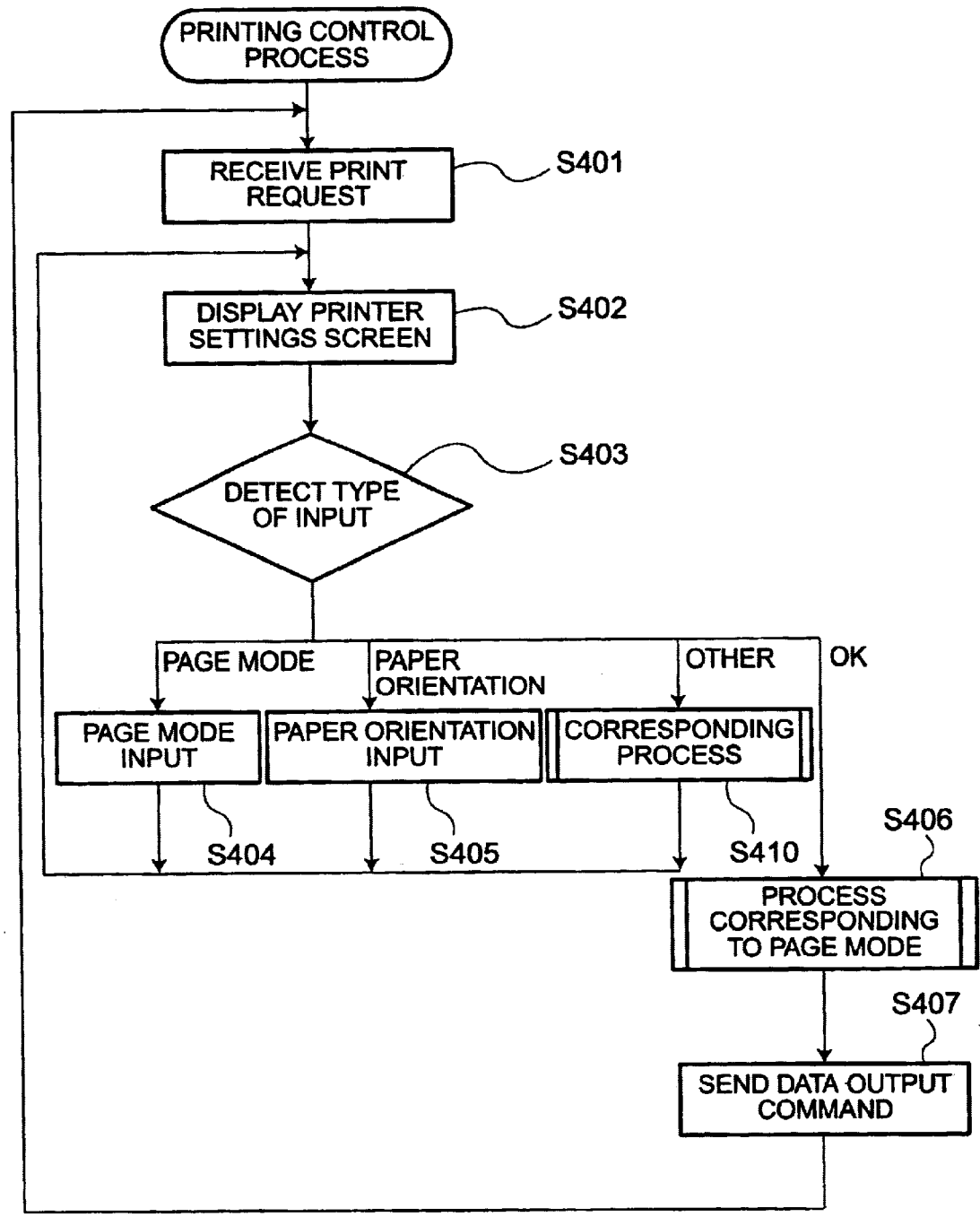
FIG. 4 is a flow chart of the printing control process of the printer driver.

FIG. 4 is a flow chart of the printing control process. When the software program of the printer driver is stored as part of the operating system in RAM 203, the CPU 201 waits for a print request to be issued by the application program (step S401). Multitasking can be achieved with currently used operating systems by having the CPU 201 execute other programs during this standby state. Note, however, that this type of control transition is not shown in the figure. The end of step S401 therefore means that a print request was issued by the application program.

When a print request is received the CPU 201 presents the printer settings stored in RAM 203 on the display 104 (step S402).

The CPU 201 also determines the type of input operation (e.g., page mode or paper orientation) input by the operator or data processing device manager by way of an input device (step S403). The operator or data processing device manager can change the printer settings by referring to the printer settings displayed on screen and manipulating an input device such as a keyboard or mouse as necessary.

If the operator or data processing device manager specifies the page mode (step S403: page mode), the page mode setting is stored in RAM 203 (step S404) and the procedure loops back to step S402.

If the operator or data processing device manager specifies the paper orientation (step S403: paper orientation), the paper orientation setting is stored in RAM 203 (step S405) and the procedure loops back to step S402.

If some other printer setting is input (step S403: other), the corresponding process is run (step S410) and the procedure loops back to step S402.

If OK is input (step S403: OK) to end printer settings input, the printer settings display is ended and the procedure advances to step S406.

When the operator or data processing device manager completes the settings (step S403: OK), CPU 201 checks the RAM 203 and generates in RAM 203 a print image of the document to be printed from the print document and printer settings data based on the page mode (step S406).

Finally, CPU 201 sends a print command and the print data generated in RAM 203 based on the above-described content to the printer (step S407).

Control then returns to step S401 to wait until a new print command is issued by the application program.

A printer driver according to this embodiment of the invention can cause printing using a print format (referred to below as a "form format") in which a page unit is the unit of the printed part printed to the print paper, or a print format (referred to below as a "report format") in which the print document is the unit of the printed part printed to the print paper.

Each of these print formats, form format and report format, can be used with paper cutting and without paper cutting.

There are, therefore, four possible page modes specifying multiple combinations of paper feeding and paper cutting of the print paper used to print the print document: a Form [Cut] mode, Form [No cut] mode, Report [Cut] mode, and Report [No cut] mode.

In the Form [Cut] mode, the print format is the form format and the paper is cut. This mode can be used, for example, when printing plural copies of a regularly sized form such as a coupon so that each coupon is printed as a single page and the print paper is cut after each coupon, that is, every page, to produce plural coupons.

In the Form [No cut] mode the print format is the form format and the paper is not cut. This mode can be used to, for example, print one print document containing text and figures so that page divisions can be determined without cutting each page of text and figures.

In the Report [Cut] mode the print format is the report format and the paper is cut. When sales data for one day is contained in one print document, for example, this mode enables sales data for each day to be printed in a batch to one printed sheet.

In the Report [No cut] mode the print format is the report format and the paper is not cut. When sales data for one day is contained in a single print document, for example, this mode enables printing one week or one month of sales data in batches of daily sales data to one printed sheet.

In addition to the above four page modes it is also possible to set a mode (referred to below as a Report [No feed] mode) in which the paper is not advanced to create a specific blank space and the paper is not cut after finishing printing one print document. For example, when a store logo is printed at the top of a receipt when receipts are issued, this mode can print the store logo for the next receipt without advancing or cutting the paper after printing the previous receipt is completed. After the logo is printed, the application program can drive the printer to cut the paper in order to issue the previous receipt. This is effective for eliminating wasting a length of the roll of paper equivalent to the length of the paper path between the print head and cutter of the printer.

Figure 5:
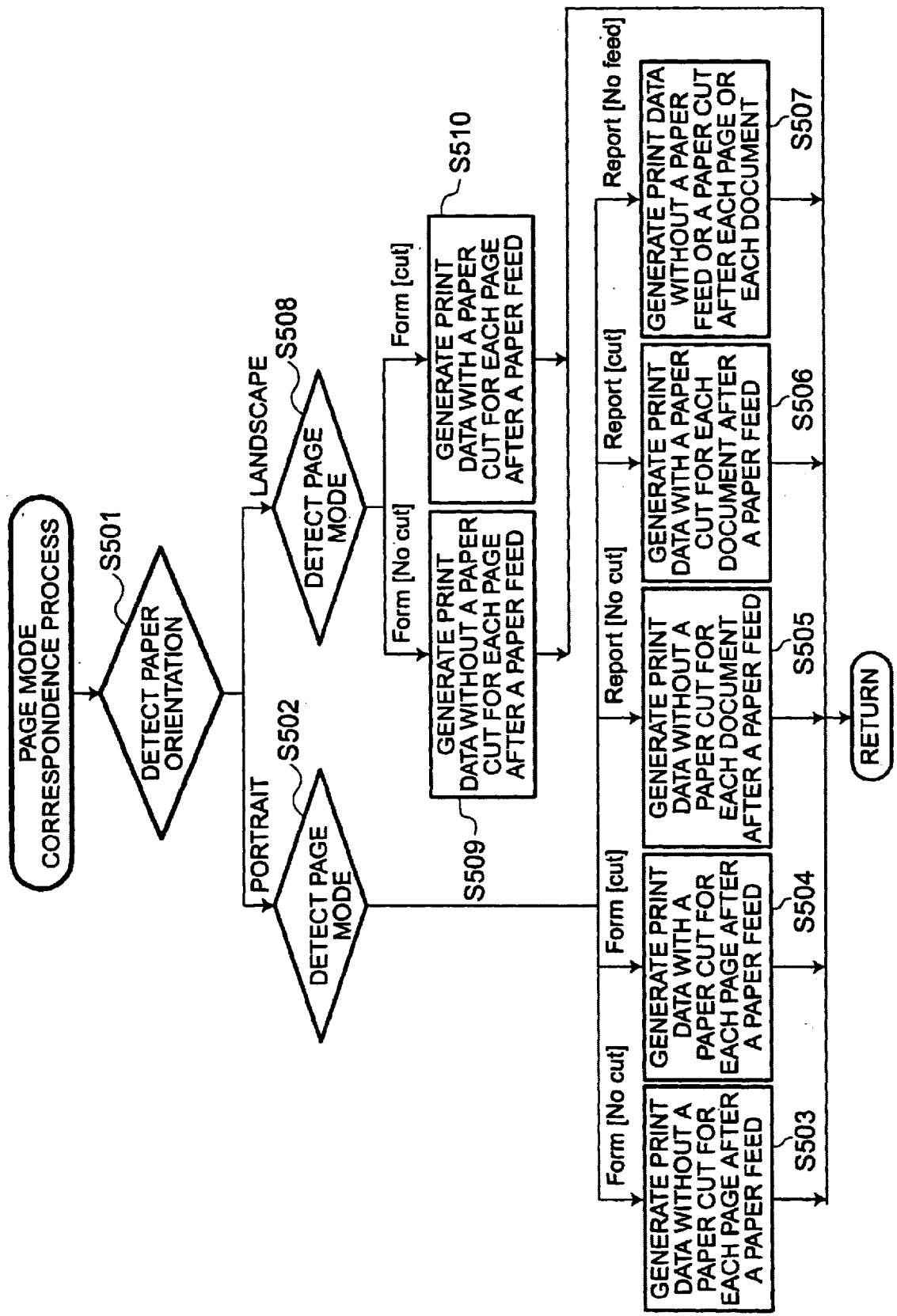
FIG. 5 is a flow chart of a page mode correspondence process.

FIG. 5 is a flow chart of a page mode correspondence process in the printing control process. First, the CPU 201 determines the paper orientation stored in RAM 203 (step S501).

If the paper orientation is "portrait" (step S501: portrait) the page mode type stored in RAM 203 is determined (step S502).

If the page mode is set to Form [No cut] (step S502: Form [No cut]), image data for printing the document to be printed is generated from the print document data so that the specified blank space is created after each printed page, that is, so that the paper is advanced after printing each page (step S503), and the page mode correspondence process ends. The paper cutting command for cutting the paper is not issued in this case.

If the page mode is set to Form [Cut] (step S502: Form [Cut]), image data for printing the document to be printed is generated from the print document data so that the specified blank space is created after each printed page, that is, so that the paper is advanced after printing each page, and the paper is cut after each page, that is, a paper cutting command for cutting the paper after the paper is advanced is issued (step S504), and the page mode correspondence process ends.

If the page mode is set to Report [No cut] (step S502: Report [No cut]), image data for printing the document to be printed is generated from the print document data so that the specified blank space is created after printing the entire print document instead of after the printed part of each page, that is, so that the paper is advanced after printing the print document is completed (step S505), and the page mode correspondence process ends. The paper cutting command for cutting the paper is not issued in this case.

If the page mode is set to Report [Cut] (step S502: Report [Cut]), image data for printing the document to be printed is generated from the print document data so that the specified blank space is created after printing the entire print document instead of after printing each page, that is, so that the paper is advanced after the entire print document is printed, and the paper is cut after each print document, that is, a paper cutting command for cutting the paper after the paper is advanced is issued (step S506), and the page mode correspondence process ends.

If the page mode is set to Report [No feed] (step S502: Report [No feed]), image data for printing the document to be printed is generated from the print document data so that the specified blank space is not created after each printed page and is not created after printing the entire print document, that is, so that the paper is not advanced even after the entire document has been printed, and the page mode correspondence process ends. The paper cutting command for cutting the paper is not issued in this case.

If the paper orientation is set to "landscape" (step S501: landscape) the page mode type stored in RAM 203 is determined (step S508).

If the page mode is set to Form [No cut] (step S508: Form [No cut]), image data for printing the document to be printed is generated from the print document data so that the specified blank space is created after each printed page, that is, so that the paper is advanced after printing each page (step S509), and the page mode correspondence process ends. The paper cutting command for cutting the paper is not issued in this case.

If the page mode is set to Form [Cut] (step S508: Form [Cut]), image data for printing the document to be printed is generated from the print document data so that the specified blank space is created after each printed page, that is, so that the paper is advanced after printing each page, and the paper is cut after each page, that is, a paper cutting command for cutting the paper after the paper is advanced is issued (step S510), and the page mode correspondence process ends.

Print images based on the page mode and paper orientation are described next below with reference to accompanying figures.

Figure 6:
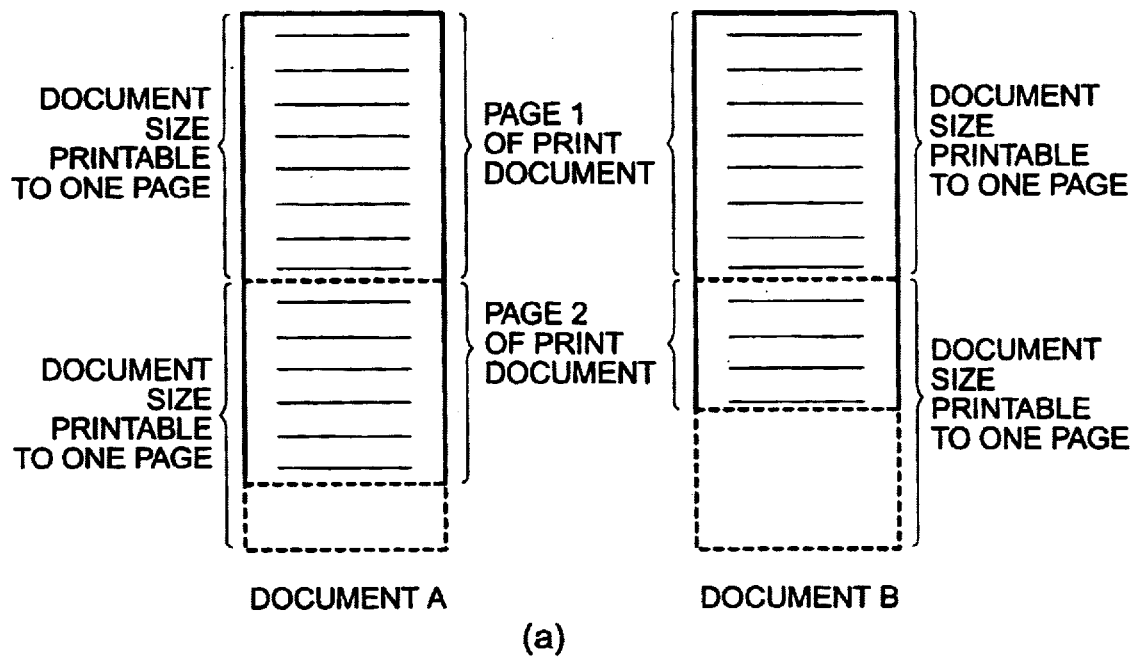
FIGS. 6a–b shows some print documents.
Figure 6:
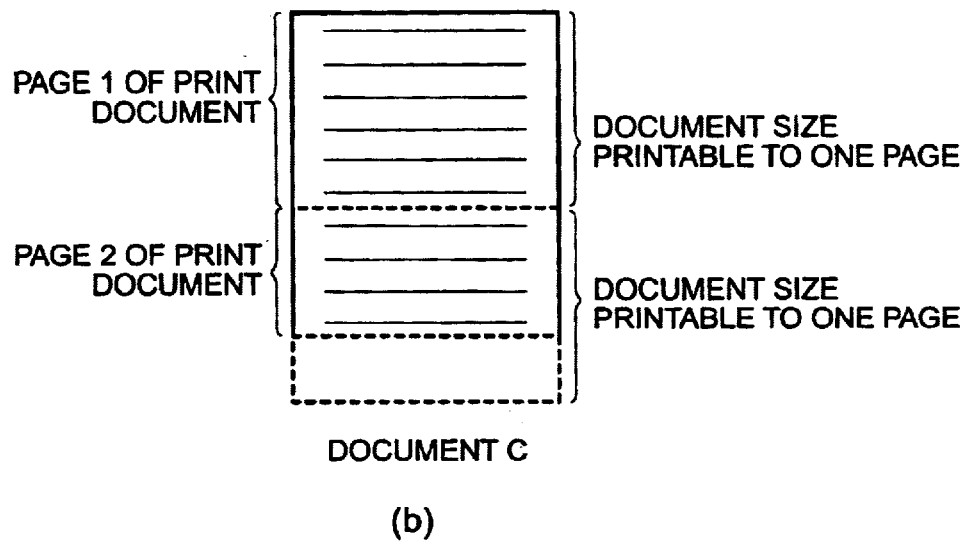

FIG. 6 shows print documents. FIG. 6(a) shows a print document when the print orientation is set to "portrait," and FIG. 6(b) shows a print document when the print orientation is set to "landscape." As shown in FIG. 6 there are three print documents, document A, document B, and document C. Document A and document B are documents for which the paper orientation is "portrait," and document C is a document for which the paper orientation is "landscape." Document A, document B, and document C each has two pages and each document ends in the middle of the second page.

Figure 7:
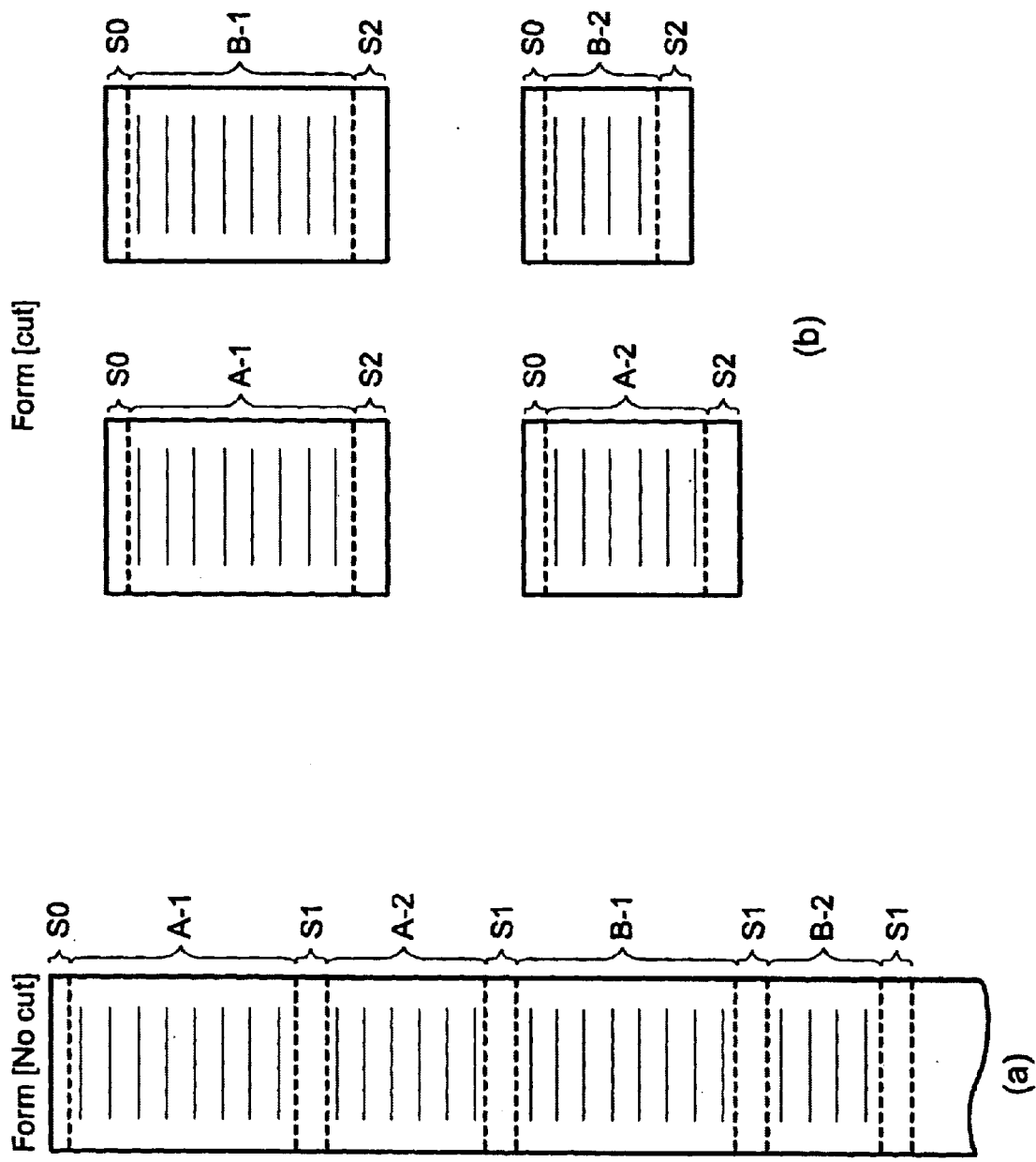
FIGS. 7a–b shows a print image when the paper orientation is set to "portrait" and the page mode is set to "form" mode.
Figure 8:
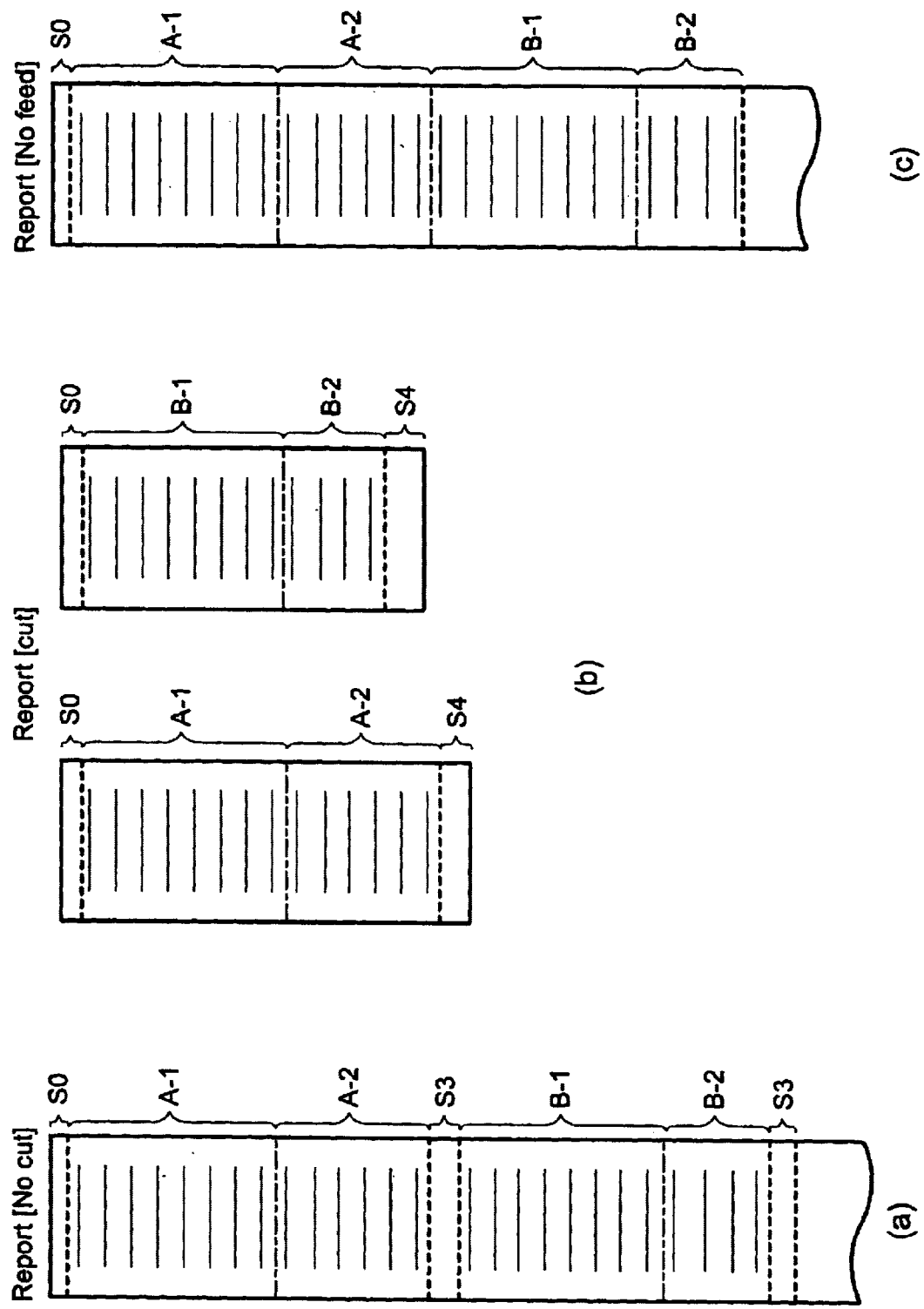
FIGS. 8a–c shows a print image when the paper orientation is set to "portrait" and the page mode is set to "report" mode.
Figure 9:
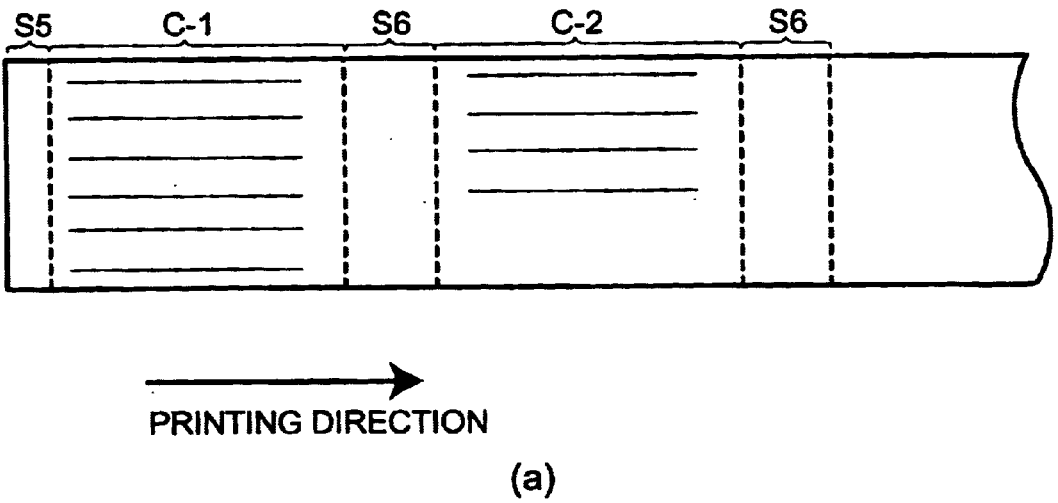
FIGS. 9a–b shows a print image when the paper orientation is set to "landscape" and the page mode is set to "form" mode.
Figure 9:
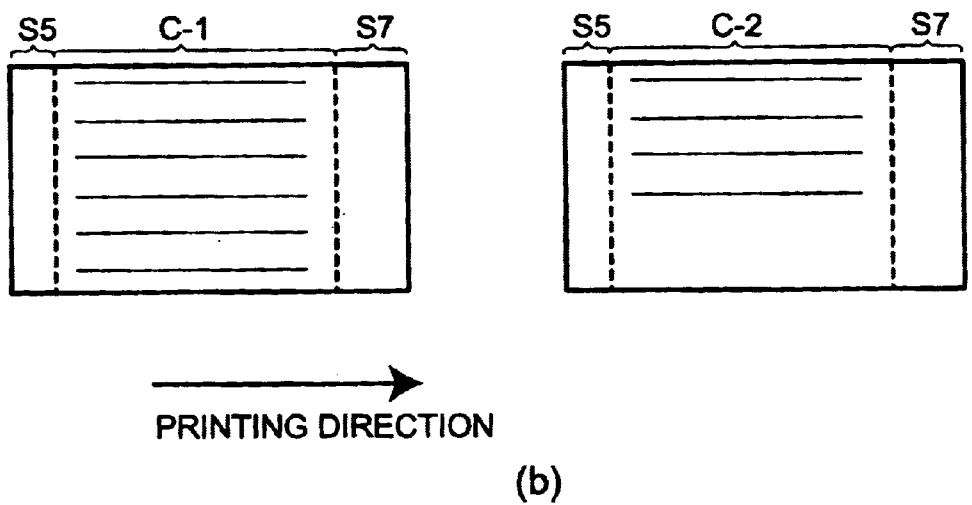

Print images of document A, document B, and document C printed in each page mode are shown in FIG. 7, FIG. 8, and FIG. 9.

FIG. 7 shows a print image in a form format for printing page units when the paper orientation is set to portrait. FIG. 7(a) shows the print image when the page mode is set to the Form [No cut] mode, and FIG. 7(b) shows a print image when the page mode is set to the Form [Cut] mode. Blank space S0 at the leading edge of the paper is blank space resulting from the amount of paper held between the printer rollers (not shown in the figure) during printing and the top margin of the form. Printed part A-1 and printed part A-2 indicate page 1 and page 2 of document A. Printed part B-1 and printed part B-2 indicate page 1 and page 2 of document B.

As shown in FIG. 7(a), the print images when the page mode is set to the Form [No cut] mode have paper feed blank space S1 created by advancing the form after printed part A-1, printed part A-2, printed part B-1, and printed part B-2, respectively. In other words, leading edge blank space S0, printed part A-1, paper feed blank space S1, printed part A-2, paper feed blank space S1, printed part B-1, paper feed blank space S1, printed part B-2, and paper feed blank space S1 are created in sequence from the top of the form to a single sheet of print paper.

As shown in FIG. 7(b), the print images when the page mode is set to the Form [Cut] mode have paper feed blank space S2 created by advancing the form after printed part A-1, printed part A-2, printed part B-1, and printed part B-2, respectively, and the print paper is then cut after the paper feed. In other words, a total of four print forms are created from the top of the print paper: one form having leading edge blank space S0, printed part A-1, and paper feed blank space S2 created in sequence; one form having leading edge blank space S0, printed part A-2, and paper feed blank space S2 created in sequence; one form having leading edge blank space S0, printed part B-1, and paper feed blank space S2 created in sequence; and one form having leading edge blank space S0, printed part B-2, and paper feed blank space S2 created in sequence.

FIG. 8 shows report format print images for printing by print document unit when the paper orientation is set to portrait. FIG. 8(a) shows the print image when the page mode is set to the Report [No cut] mode, FIG. 8(b) shows a print image when the page mode is set to the Report [Cut] mode, and FIG. 8(c) shows a print image when the page mode is set to the Report [No feed] mode. Blank space S0 at the leading edge of the paper is blank space resulting from the amount of paper held between the printer rollers (not shown in the figure) during printing and the top margin of the form. Printed part A-1 and printed part A-2 indicate page 1 and page 2 of document A. Printed part B-1 and printed part B-2 indicate page 1 and page 2 of document B.

As shown in FIG. 8(a), the print images of printed part A-1, printed part A-2, printed part B-1, and printed part B-2 when the page mode is set to the Report [No cut] mode have paper feed blank space S3 created by advancing the paper after the last printed part of each print document, that is, after printed part A-2 of document A and after printed part B-2 of document B. In other words, leading edge blank space S0, printed part A-1, printed part A-2, paper feed blank space S3, printed part B-1, printed part B-2, and paper feed blank space S1 are created in sequence from the top of the form to a single sheet of print paper.

As shown in FIG. 8(b), the print images of printed part A-1, printed part A-2, printed part B-1, and printed part B-2 when the page mode is set to the Report [Cut] mode have paper feed blank space S4 created by advancing the paper after the last printed part of each print document, that is, after printed part A-2 of document A and after printed part B-2 of document B, and the paper is then cut after the paper is advanced. In other words, a total of two printed sheets is created from the top of the print paper: one sheet having leading edge blank space S0, printed part A-1, printed part A-2, paper feed blank space S4 created in sequence, and one sheet having leading edge blank space S0, printed part B-1, printed part B-2, and paper feed blank space S4 created in sequence.

As shown in FIG. 8(c), the print image of the page when the page mode is set to the Report [No feed] mode has printed part A-1, printed part A-2, printed part B-1, and printed part B-2 created continuously with no blank space between the printed parts. In other words, leading edge blank space S0, printed part A-1, printed part A-2, printed part B-1, and printed part B-2 are created in sequence from the top of the form to a single sheet of print paper.

FIG. 9 shows print images in the form format for printing by page unit when the paper orientation is set to landscape.

FIG. 9(a) shows a print image when the page mode is set to the Form [No cut] mode, and FIG. 9(b) shows a print image when the page mode is set to the Form [Cut] mode. The left margin blank space S5 of the page is blank space resulting from the amount of paper held between the printer rollers (not shown in the figure) during printing and the left margin of the form. Printed part C-1 and printed part C-2 indicate page 1 and page 2 of document C. Note that the left margin blank space must be considered as noted above when the print direction is left to right as indicated in FIG. 9(a), but when the print direction is right to left the right margin blank space is considered instead of the above-noted left margin blank space.

As shown in FIG. 9(a), the print images when the page mode is set to the Form [No cut] mode have paper feed blank space S6 created to the right of each printed part, printed part C-1 and printed part C-2, by advancing the form. In other words, left margin blank space S5, printed part C-1, paper feed blank space S6, printed part C-2, and paper feed blank space S6 are created in sequence from the left end of the form to a single sheet of print paper.

As shown in FIG. 9(b), the print images when the page mode is set to the Form [Cut] mode have paper feed blank space S7 created to the right of each printed part, printed part C-1 and printed part C-2, by advancing the form, and the print paper is then cut after the paper is advanced. In other words, a total of two print sheets is created from the left end of the print paper: one printed sheet having blank space S5 at the left end of the paper, printing part C-1, and paper feed blank space S7 created in sequence; and one printed sheet having blank space S5 at the left end of the paper, printing part C-2, and paper feed blank space S7 created in sequence.

It should be noted that the length of blank spaces S0 to S7 is adjustable by the application program.

Figure 10:
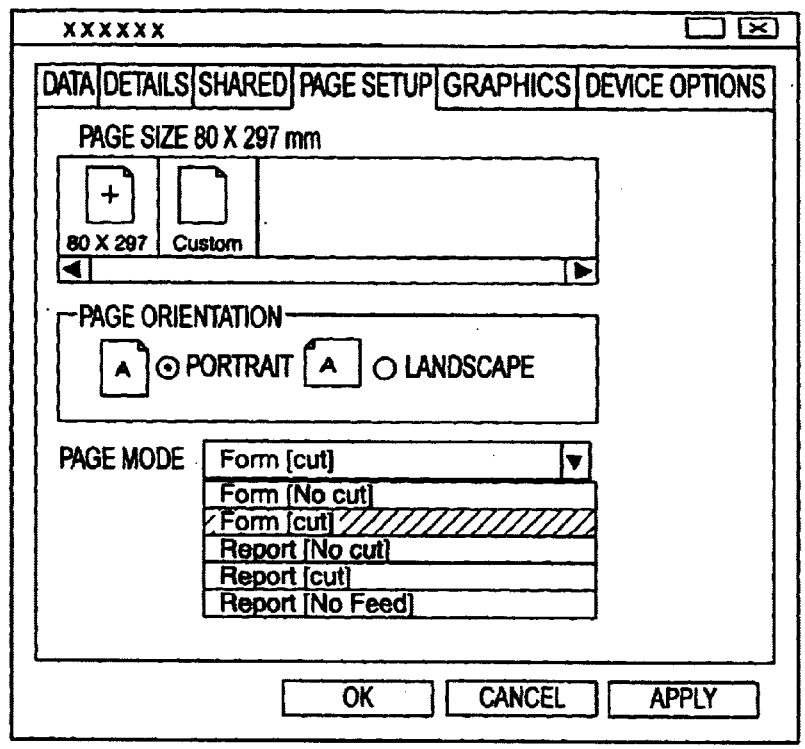
FIGS. 10a–b shows a printer parameter settings screen.
Figure 10:
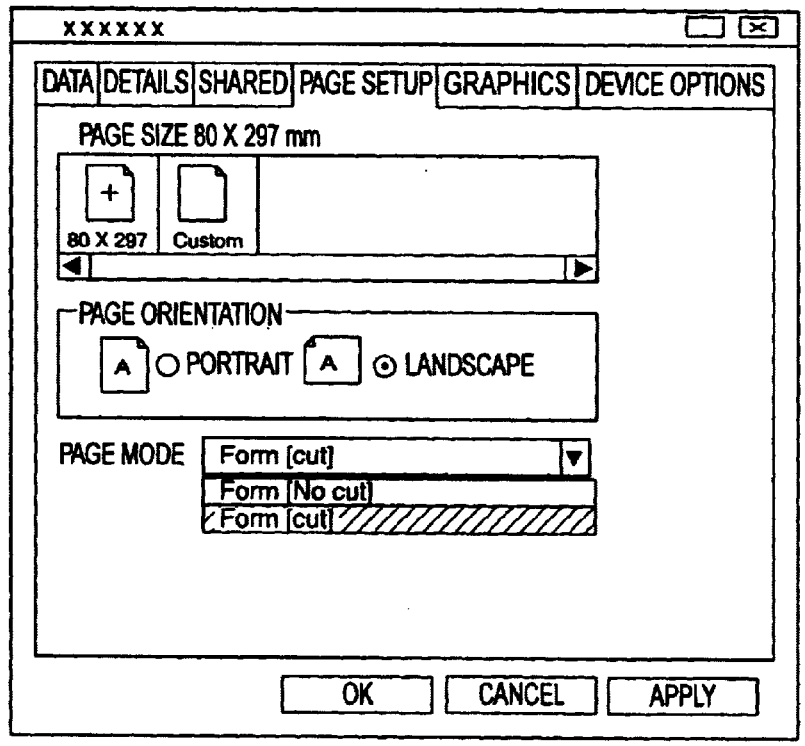

FIG. 10 shows a printer settings screen (a so-called printer properties window) for inputting the page mode and paper orientation. FIG. 10(a) shows a printer settings screen in which the paper orientation is set to portrait, and FIG. 10(b) shows a printer settings screen in which the paper orientation is set to landscape.

When the user selects "portrait" as the paper orientation as shown in FIG. 10 (a), the five selectable page modes, that is, the Form [No cut] mode, Form [Cut] mode, Report [No cut] mode, Report [Cut] mode, and Report [No feed] mode, are presented in a pop-up menu. The desired mode is selected from the displayed five page modes.

When the user selects "landscape" as the paper orientation as shown in FIG. 10(b), the two selectable page modes, that is, the Form [No cut] mode and Form [Cut] mode, are presented in a pop-up menu. The desired mode is selected from the displayed two page modes.

The present invention as described above offers the following benefits.

An application program can be created without considering the printer driver by controlling paper advancement according to the page units of each print document or controlling paper advancement by document unit for each print document, controlling cutting the paper after paper advancement, and controlling printing page units of the one or plural print documents based on plural combinations of paper advancing and paper cutting when printing one or plural print documents for which there is a print request from the application program. That is, printer settings can be made using a printer driver providing a common interface from any application program used.

It is also possible to print print documents of an indefinite length in a report format, such as a daily sales report showing sales results for one day.

The present embodiment describes an example in which the size of the last page varies according to the print data when the paper orientation of a form format document is set to portrait, but paper feeding and paper cutting can also be controlled so that even the last page is the same size as the page size defined for the other pages.

What is claimed is:

1. A printer driver comprising a page interval controller for controlling the printing on print-paper of one or multiple print-documents selectively printed on one of a page-by-page basis and a document-by-document basis, wherein:

in said page-by-page basis, a document is printed in page units of predefined paper size irrespective of the content of said document, and the size of each page unit is defined by plural combinations of print-paper feeding and cutting operations, and in said document-by-document basis, a document is printed in a single page of size determined by the content of said document, wherein the size of said single page is selected to be sufficient for printing the entire content of the document.

2. The printer driver of claim 1, wherein said page interval controller includes:

a paper feed controller for controlling the feeding of print-paper for each page of said one or multiple print-documents and for controlling the feeding of print-paper after each of said print-documents; and a paper cutting controller for controlling the cutting of said print-paper.

3. The printer driver of claim 2, wherein said paper feed controller advances said print-paper at the end of each page of at least one of said one or multiple print-documents.

4. The printer driver of claim 2, wherein said paper feed controller advances said print-paper at the end of each document constituting said one or multiple print-documents.

5. The printer driver of claim 2, wherein said paper cutting controller controls whether or not to cut said print-paper after a paper feed operation.

6. A printer driver comprising a page interval controller for controlling the printing on print-paper of one or multiple print-documents to be printed in page units where a specific paper size for one page is determined by plural combinations of print-paper feeding and cutting operations, said printer driver further comprising:

a print request receiver for receiving a print request containing print-document data from an application program;

a settings data display controller for selecting and displaying printer settings data according to the print request;

an input controller for controlling the inputting of specific information for printing said one or multiple print-documents;

a print data generator for generating print data based on the printer settings and said specific information; and a transmitter for sending said print data to a printer.

7. The printer driver of claim 6, wherein said settings data display controller displays plural predefined combinations of print-paper feeding and cutting operations for control by said page interval controller.

8. The printer driver of claim 6, wherein said input controller receives a paper orientation option specifying whether an undefined span in the length-wise direction of said print-paper is printed as the document length or printed as the document width.

9. The printer driver of claim 6, wherein said input controller selects a desired combination from plural predefined combinations of print-paper feeding and cutting operations for control by said page interval controller.

10. A printing control method comprising:

(a) controlling the printing on print-paper of one or multiple print-documents selectively printed on one of a page-by-page basis and a document-by-document basis, wherein:

in said page-by-page basis, a document is printed in page units of predefined paper size irrespective of the content of said document, and the size of each page unit is defined by plural combinations of print-paper feeding and cutting operations, and in said document-by-document basis, a document is printed in a single page of size determined by the content of said document, wherein the size of said single page is selected to be sufficient for printing the entire content of the document.

11. The printing control method of claim 10, wherein said page interval control step (a) includes:

(a1) controlling print-paper feeding for each page of said one or multiple print-documents;

(a2) controlling print-paper feeding after each of said print-documents; and (a3) controlling the cutting of said print-paper.

12. The printing control method of claim 11, wherein said paper feed control step (a1) advances said print-paper at the end of each page of at least one of said one or multiple print-documents.

13. The printing control method of claim 11, wherein said paper feed control step (a1) advances said print-paper at the end of each document constituting said one or multiple print-documents.

14. The printing control method of claim 11, wherein said paper cutting control step (a3) controls whether or not to cut said print-paper after a paper feed operation.

15. A printing control method comprising:

(a) controlling the printing on print-paper of one or multiple print-documents to be printed in page units where a specific paper size for one page is determined by plural combinations of print-paper feeding and cutting operations (b) receiving a print request containing print-document data from an application program;

(c) selecting and displaying printer settings data according to the print request;

(d) controlling the inputting of specific information for printing said one or multiple print-documents;

(e) generating print data based on the printer settings and said specific information; and (f) sending said print-data to a printer.

16. The printing control method of claim 15, wherein the settings data display control step (c) displays plural predefined combinations of print-paper feeding and cutting operations for control by the page interval control step (a).

17. The printing control method of claim 15, wherein the input control step (d) receives a paper orientation option specifying whether an undefined span in the length-wise direction of said print-paper is printed as the document length or printed as the document width.

18. The printing control method of claim 15, wherein the input control step (d) receives a desired combination from plural predefined combinations of print-paper feeding and cutting operations for control by the page interval control step (a).

19. A data storage medium recording a program for executing the printing control method of claim 10.

20. The data storage medium of claim 19, wherein said data storage medium is one of a Compact Disc, a floppy disk, a hard disk, a magneto-optical disc, a Digital Video Disc, a semiconductor memory, and a magnetic tape.

21. The printer driver of claim 1, wherein the size of said single page in said document-by-document basis is selected to be the minimum amount of paper length required for printing the entire content of the document.

22. The printer driver of claim 2, wherein said printer driver is further effective for selectively advancing said print-paper without cutting at the end of each page of a multi-page document or at the end of a complete document.

23. The printing control method of claim 10, wherein the size of said single page in said document-by-document basis is made to have the minimum amount of paper length required for printing the entire content of the document.

24. The printing control method of claim 11, wherein said printing method is further effective for selectively advancing said print-paper without cutting at the end of each page of a multi-page document or at the end of a complete document.

* * * * *

UNITED STATES PATENT AND TRADEMARK OFFICE
CERTIFICATE OF CORRECTION

PATENT NO. : 6,663,303 B2
DATED : December 16, 2003
INVENTOR(S) : Yukiharu Horiuchi et al.

It is certified that error appears in the above-identified patent and that said Letters Patent is hereby corrected as shown below:

Title page,
Item [57], ABSTRACT,
Please change "When printing a print document for which there is a print request from an application program, printing the one or plural print documents printed by page unit where a specific paper size is one page is controlled based on plural combinations of print paper feeding and cutting." to -- A method of controlling printing on one or a plurality of printing documents on a page basis using a specifed sheet size for one page and based on a plurality of combinations of a sheet-feed and a sheet-cut of printing sheets, in printing on printing documents as requested by an application program. When a page mode is in a Form [No cut] mode, print image data is prepared so that a sheet-feed is executed at the end of one-page printing, (step S503); when in a Form [Cut] mode, print image data is prepared so that a sheet-feed is executed at the end of one-page pringing, and a sheet-cut command is issued at the end of the sheet-feed (step S504); when in a Report [No cut] mode, print image data is prepared so that a sheet-feed is executed at the end of one-printing-document printing (step S505); and when in a Report [Cut] mode, print image data is prepared so that a sheet-feed is executed at the end of one-printing-document printing, and a sheet-cut command is issued at the end of the sheet-feed (step S506) to complete a page mode-compliant processing. --

Signed and Sealed this

Twenty-ninth Day of June, 2004

JON W. DUDAS
*Acting Director of the United States Patent and Trademark Office*